United States Patent [19]

Seha

[11] 3,933,866

[45] Jan. 20, 1976

[54] PROCESS FOR THE MANUFACTURE OF AMINO-ANTHRAQUINONES

[75] Inventor: Zdenek Seha, Basel, Switzerland

[73] Assignee: Ciba-Geigy AG, Basel, Switzerland

[22] Filed: Sept. 26, 1973

[21] Appl. No.: 400,759

[30] Foreign Application Priority Data
Oct. 5, 1972   Switzerland.................... 14562/72

[52] U.S. Cl. ............................................. 260/382
[51] Int. Cl.² ...................................... C07C 87/64
[58] Field of Search ................................... 260/382

[56] References Cited
FOREIGN PATENTS OR APPLICATIONS
2,211,411   9/1972   Germany ............................ 260/382

OTHER PUBLICATIONS

Parker, Chemical Reviews, Vol. 61, No. 1 pp. 1–32 (1969).

Primary Examiner—Lorraine A. Weinberger
Assistant Examiner—Jane S. Myers
Attorney, Agent, or Firm—Joseph G. Kolodny; Prabodh I. Almaula; Edward McC. Roberts

[57] ABSTRACT

A process for the manufacture of aminoanthraquinones from nitroanthraquinone, wherein the nitroanthraquinones are treated with ammonia in dipolar aprotic solvents that are inert towards ammonia and nitroanthraquinones.

5 Claims, No Drawings

PROCESS FOR THE MANUFACTURE OF AMINO-ANTHRAQUINONES

The present invention provides a process for the manufacture of aminoanthraquinones from nitroanthraquinones, wherein the nitroanthraquinones are treated with ammonia in dipolar apotric solvents that are inert towards ammonia.

The reaction takes place according to the general reaction equation

The reaction can be carried out with monoanthraquinones and/or dinitroanthraquinones. The anthraquinone nuclei can optionally contain further substituents, e.g. halogen (fluorine, chlorine, or bromine) or lower alkyl groups, i.e., with 1 to 4 carbon atoms.

The ammonolysis takes place already at normal pressure and room temperature. The process can be carried out in various solvents that are inert towards ammonia and nitroanthraquinones, at normal or elevated pressure in the temperature range between 20°C and 250°C. Suitable apparatus is the rotary evaporator or, for batches on an industrial scale, the paddle drier. Advantageously the process is carried out in dipolar aprotic solvents with a delectric constant of at least 30. Suitable solvents contain e.g. a group of the formula $$- SO_2 - \text{ or } - SO -$$

As examples there may be cited: dimethyl sulphoxide and, above all, open-chain or cyclic, low molecular sulphones of the formula

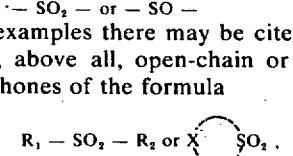

wherein $R_1$ and $R_2$ each represents a straight or branched alkyl group with 1 to 4 carbon atoms or a phenyl group that is optionally substituted with low molecular alkyl, halogen, or nitro, and X represents a straight or branched hydrocarbon chain with 4 to 10 carbon atoms which is optionally substituted with halogen or acetoxy.

Examples of such sulphones are:

Dialkyl Sulphones dimethyl sulphone, methylethyl sulphone, diethyl sulphone, methyl-n-propyl sulphone, methylisopropyl sulphone, methyl-n-butyl sulphone, ethylisobutyl sulphone, methyl-(1-methylbutyl) sulphone, diisopropyl sulphone etc.

Alkylene Sulphones tetramethyl sulphone, 3-methyl-tetramethylene sulphone, pentamethylene sulphone, hexamethylene sulphone, etc.

Alkylsulphonyl Compounds bis-(alkylsulphonyl)alkanes, such as bis-(methylsulphonyl)methane, bis-(ethylsulphonyl)methane, bis-(ethylsulphonyl)dimethylmethane, etc.

Also suitable are mixtures of the above cited solvents. Preferably there tetramethylene sulphone or dimethyl sulphone is used.

The reaction mixture formed by nitrating anthraquinone with nitric acid in the presence of such sulphones, and from which the excess nitric acid has been distilled off, can be used direct for the ammonolysis. The anthraquinone present in such mixtures is retained unchanged and can be isolated from the aminoanthraquinones by, for example, treating the reaction product with aqueous acid. The solvent can be recovered in virtual entirety after the ammonolysis by simple distillation. The process consequently provides a process in which virtually no waste products, particularly no effluent, are formed. Compared with the conventional process hitherto used for converting 1-nitroanthraquinone to 1-aminoanthraquinone, i.e. the reduction in aqueous solution with e.g. sodium sulphide, the new process has the advantage of a simpler and effluent-free mode of operation. A further advantage is the selectivity of the ammonolysis in the solvents used. Thus, for example, where 2-nitroanthraquinone is present in the 1-nitroanthraquinone, the undesirable 2-aminoanthraquinone in the product was only 10 percent through ammonolysis obtained. The aminoanthraquinones obtained according to the invention are valuable intermediates for the manufacture of dyestuffs.

The following Examples illustrate the invention, the parts and percentages being by weight.

EXAMPLE 1

51 parts of 1-nitroanthraquinone in 250 parts of tetramethylene sulphone are heated in a flask (advantageously connected to a rotary evaporator) to 135°-140°C and then gaseous ammonia is passed into the solution. The water of reaction formed in the process is continuously distilled off and removed. The nitrogen that has formed is expelled by passing in fresh ammonia. Upon completion of the reaction the tetramethylene sulphone is completely distilled off in vacuo. The residue contains 1-aminoanthraquinone in almost quantitative yield.

EXAMPLE 2

A mixture of 65.4 parts of anthraquinone, 176 parts of 1-nitroanthraquinone, 12 parts of 2-nitroanthraquinone, and 1.5 parts of dinitroanthraquinone in 1,000 parts of tetramethylene sulphone is heated in a flask (advantageously connected to a rotary evaporator) to 135°-140°C and then gaseous ammonia is passed into the solution. The water of reaction that forms in the process is continuously distilled off and is removed. The resulting nitrogen is expelled by passing in fresh ammonia. Upon completion of the reaction (about 8 to 10 hours) the tetramethylene sulphone is distilled off completely in vacuo.

The residue contains about 90 percent of unreacted 2-nitroanthraquinone, anthraquinone, and amounts of amino- and diaminoanthraquinones corresponding to the nitroanthraquinones. The yield is virtually quantitative.

The mixture used as starting material is advantageously obtained by heating 208 parts of anthraquinone in a mixture of 945 parts of 100 percent nitric acid and 240 parts of tetramethylene sulphone within a few minutes to about 70°C. After 3 to 5 minutes 760 parts of tetramethylene sulphone are added to the mixture and subsequently the nitric acid is distilled off completely.

EXAMPLE 3

In an autoclave, 10 parts of ammonia are added to 51 parts of 1-nitroanthraquinone in a mixture of 250 parts of tetramethylene sulphone and 6 parts of water and the batch is heated to 140°C. Excess ammonia is drawn off after 2 hours and the tetramethylene sulphone is completely distilled off in vacuo. The residue contains 1-aminoanthraquinone in virtually quantitative yield.

EXAMPLE 4

In a flask (advantageously connected to a rotary evaporator) 28.8 parts of 1-nitro-5-chloroanthraquinone in 140 parts of tetramethylene sulphone are heated to 150°C and gaseous ammonia is then passed into the solution. Upon completion of the reaction (about 10 hours) the tetramethylene sulphone is completely distilled off. The residue contains 1-amino-5-chloro-anthraquinone and traces of 1,5-diaminoanthraquinone. The yield is virtually quantitative.

EXAMPLE 5

In a flask (advantageously connected to a rotary evaporator) 28.8 parts of 1 nitro-8-chloroanthraquinone in 140 parts of sulpholane are heated to 140°C and then gaseous ammonia is passed in. Upon completion of the reaction (about 12 hours) the sulpholane is completely distilled off in vacuo. The residue contains 1,8-aminochloroanthraquinone and traces of 1,8-diaminoanthraquinone. The yield is virtually quantitative.

EXAMPLE 6

In a flask (advantageously connected to a rotary evaporator) 26.7 parts of 1-nitro-2-methylanthraquinone in 200 parts of tetramethylene sulphone are heated to 170°C and then gaseous ammonia is passed into the solution. Upon completion of the reaction (about 16 hours) the tetramethylene sulphone is completely distilled off in vacuo. The residue contains 1-amino-2-methylanthraquinone in virtually quantitative yield.

EXAMPLE 7

A mixture of 65.4 parts of anthraquinone, 176 parts of 1-nitro-anthraquinone, 12 parts of 2-nitroanthraquinone, and 1.5 parts of dinitroanthraquinone in 1000 parts of dimethyl sulphone is heated to 140°–145°C in a flask (advantageously connected to a rotary evaporator) and then gaseous ammonia is passed into the solution. The nitrogen that has formed is expelled by passing in fresh ammonia. Upon completion of the reaction (about 16 hours) the dimethyl sulphone is distilled off in vacuo.

The residue contains anthraquinone, about 90 percent of 2-nitroanthraquinone, and amounts of 1-amino- and diaminoanthraquinones corresponding to the remainder of the nitroanthraquinones.

I claim:

1. A process for the manufacture of 1-aminoanthraquinone which may be substituted with halogen or lower alkyl from corresponding nitroanthraquinone, wherein the nitroanthraquinone is reacted with ammonia in dipolar aprotic solvents that are inert towards ammonia and nitroanthraquinones and having a dielectric constant of at least 30 and of the formula

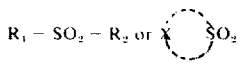

wherein $R_1$ and $R_2$ each are straight or branched alkyl with 1 to 4 carbon atoms or phenyl or phenyl substituted with lower alkyl, halogen or nitro, X is a straight or branched hydrocarbon chain with 4 to 10 carbon atoms which may be substituted with halogen or acetoxy, in a temperature range between 20°C and 250°C.

2. A process according to claim 1, wherein the dipolar aprotic solvent is selected from the group consisting of dimethyl sulphone, methylethyl sulphone, diethyl sulphone, methyl-n-propyl sulphone, methylisopropyl sulphone, methyl-n-butyl sulphone, ethylisobutyl sulphone, methyl-(1-methylbutyl)-sulphone, diisopropyl sulphone, tetramethyl sulphone, 3-methyltetramethylene sulphone, pentamethylene sulphone or hexamethylene sulphone.

3. A process according to claim 1, wherein a mixture of anthraquinone and nitroanthraquinones obtained by nitration of anthraquinone with nitric acid and dissolved in a solvent of the formula

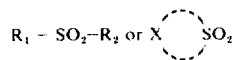

in which $R_1$ and $R_2$ each represents a straight or branched alkyl group with 1 to 4 carbon atoms and X represents an optionally substituted, straight or branched hydrocarbon chain with 4 to 10 carbon atoms, is reacted with ammonia.

4. A process according to claim 1, wherein tetramethylene sulphone is used as solvent.

5. A process according to claim 1, wherein gaseous ammonia is used.

* * * * *